(12) United States Patent
Anand

(10) Patent No.: US 10,390,309 B1
(45) Date of Patent: Aug. 20, 2019

(54) SYSTEM AND METHOD FOR OPTIMIZING POWER CONSUMPTION IN MOBILE DEVICES

(71) Applicant: TriSpace Technologies Pvt (OPC) Ltd., Bangalore (IN)

(72) Inventor: Narasimhan Vijay Anand, Bangalore (IN)

( * ) Notice: Subject to any disclaimer, the term of this patent is extended or adjusted under 35 U.S.C. 154(b) by 0 days.

(21) Appl. No.: 16/273,741

(22) Filed: Feb. 12, 2019

(30) Foreign Application Priority Data

Apr. 18, 2018 (IN) .............................. 201841014667

(51) Int. Cl.
| | |
|---|---|
| *H04M 1/00* | (2006.01) |
| *H04W 52/02* | (2009.01) |
| *G10L 19/00* | (2013.01) |
| *H04N 19/117* | (2014.01) |
| *H04N 19/156* | (2014.01) |

(52) U.S. Cl.
CPC ..... *H04W 52/0261* (2013.01); *G10L 19/0019* (2013.01); *H04N 19/117* (2014.11); *H04N 19/156* (2014.11); *H04W 52/0264* (2013.01)

(58) Field of Classification Search
CPC .......... H04W 52/0261; H04W 52/0264; G10L 19/0019; H04N 19/117; H04N 19/156
See application file for complete search history.

(56) References Cited

U.S. PATENT DOCUMENTS

| | | | | |
|---|---|---|---|---|
| 2014/0071808 | A1* | 3/2014 | Snell | H04L 41/0672 370/216 |
| 2015/0326887 | A1* | 11/2015 | Ducloux | H04N 19/176 375/240.02 |

\* cited by examiner

*Primary Examiner* — Barry W Taylor
(74) *Attorney, Agent, or Firm* — J. Peter Paredes; Rosenbaum, IP, P.C.

(57) ABSTRACT

The present invention provides a system and method for optimizing power consumption in mobile devices. The system comprises a speech codec encoder module and a speech codec decoder module. The number of CPU/DSP/VLIW processor cycles taken to encode and decode the speech signals are significantly reduced to draw lower current by the mobile device. The significant reduction of processor cycles in the speech codec modules enables reduction of power consumption in the talk time. Thus, the invention provides a simple method of optimizing power consumption by reducing number of processor cycles to compress/decompress speech signal of the speech codec modules in mobile devices.

10 Claims, 2 Drawing Sheets

SYSTEM AND METHOD FOR OPTIMIZING POWER CONSUMPTION IN MOBILE DEVICES

CROSS-REFERENCE TO RELATED APPLICATIONS

The present applications claims priority from Indian patent application serial no. 201841014667, filed Apr. 18, 2018, and granted as Indian Patent No. 302522 on Oct. 29, 2018, herein incorporated by reference in its entirety.

BACKGROUND

The present invention relates to a system and method for optimizing power consumption in mobile devices. More specifically, the present invention relates to optimizing power consumption in mobile devices by reducing number of processor cycles to increase talk time in a voice call.

Wireless communication devices may be divided by function into voice devices such as cellular telephones and data devices such as PDAs or portable computers with wireless interfaces. Recent advances also include many smart portable wireless devices that can handle both voice and data and typically have a wide range of functional capabilities.

Such wireless communication devices are portable and therefore, they are typically dependent upon a battery. The wider array of functional capabilities may lead to increased power demands and furthermore, the rate at which battery power is consumed may vary greatly depending on the types of function performed and the frequency of use of those functions.

Additionally, wireless handsets are being designed to operate as multi-mode phones. Depending on the operational mode, the battery power that is consumed can vary substantially.

Minimizing power consumption and/or improving the data rate and user experience in User Equipment (UE) devices is important for all wireless communications systems. UE devices are increasingly consuming higher amounts of power as they become more and more sophisticated. UE devices have an onboard battery with a limited capacity. Thus, there is a problem of getting the best possible user experience under the constraint of a limited battery.

The U.S. patent document U.S. Pat. No. 8,073,498B2 titled "Method of optimizing power consumption in a wireless device" discloses a method and apparatus for operating a wireless communication device. The method includes the steps of providing a plurality of battery powered modules that are carried by a user and together operate as the wireless communication module, detecting a battery reserve power level of a first module of the plurality of modules and transferring a processing function from the first module to a second module of the plurality of modules based upon the detected battery reserve power. However, the method does not disclose the techniques to improve talk time of mobile devices.

The U.S. patent document U.S. Pat. No. 7,508,169B2 titled "system and method for power consumption management during operation of an electronic device" discloses a battery-driven electronic device, which is operable in different modes with related power consumption. The device includes a data presentation function and a power consumption detecting function to establish current power consumption based on established current power consumption. By detecting and presenting data pertaining to the current power consumption, rather than a predetermined expected way of use, such as talk mode or standby mode, better control may be given to a user of the device so that it may be operated to extend the battery life. However, the method does not disclose the techniques to improve talk time of mobile devices.

Hence, there exists is a need for system and method to optimize power consumption in mobile devices in an efficient manner.

SUMMARY OF THE INVENTION

Provided herein are systems, methods, and apparatuses for optimizing power consumption in mobile devices.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Figure 1:
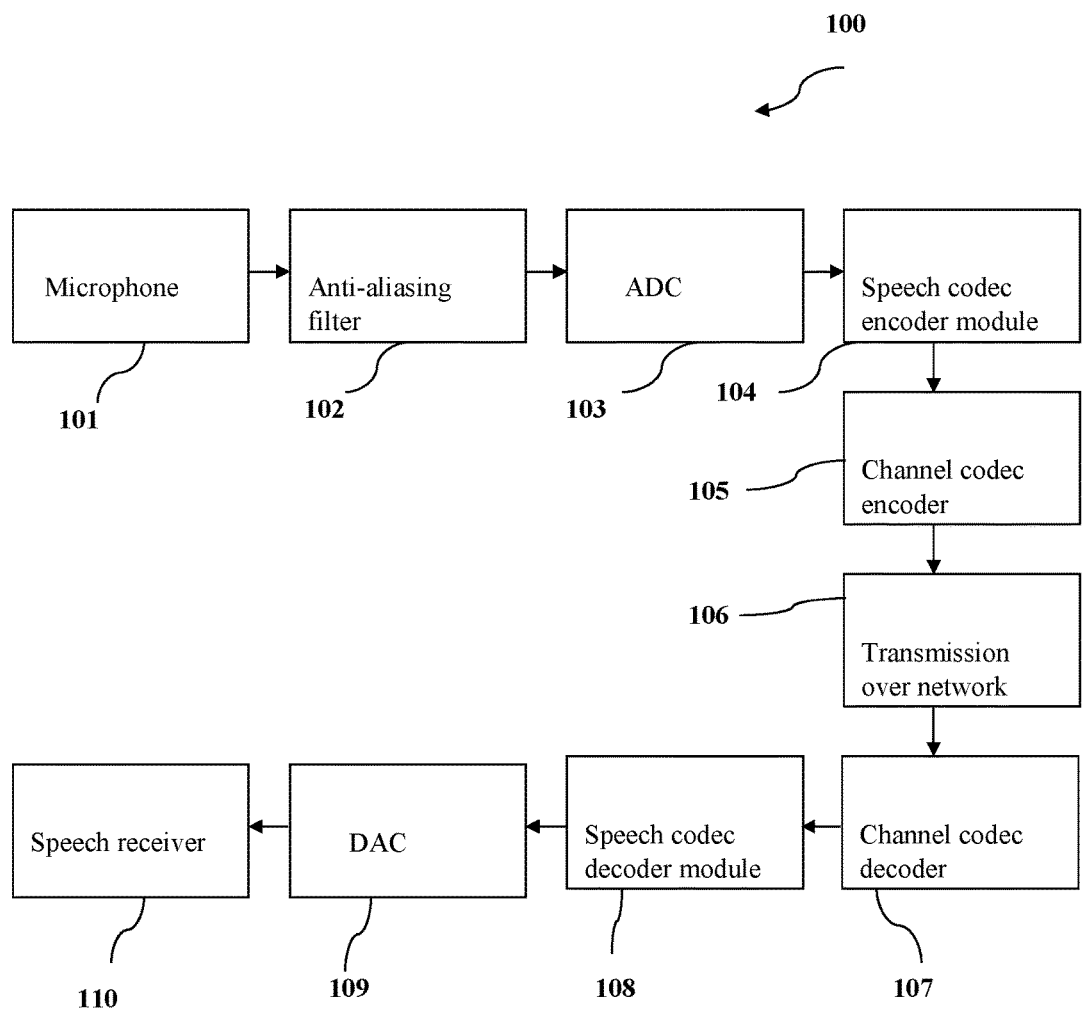
FIG. 1 illustrates a block diagram of a system for optimizing power consumption in mobile devices, according to one embodiment of the invention.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

The present invention overcomes the drawbacks in the prior art and provides a system and method for optimizing power consumption in mobile devices.

The system comprises a microphone which receives input speech and converts the speech into an electrical signal. The microphone is placed inside the mobile device. An anti-aliasing filter (AAF) receives signals from the microphone and transmits the signals to the ADC converter. The anti-aliasing filter is configured to filter components of the signal which are above the Nyquist frequency to prevent aliasing occurring at the sampling stage.

In an embodiment of the invention, a speech codec encoder module is disposed at the transmitting end. The speech codec encoder module is configured to compress/encode the signals for efficient transmission over wireless channels. The number of CPU/DSP/VLIW processor cycles are reduced during speech encoding in the speech codec encoder module to draw less power by mobile device. The encoded signals are then channel encoded before transmission to network.

The system also includes speech codec decoder module disposed at the receiving end. The speech codec decoder module is configured to decompress/decode the received compressed signals from a channel codec decoder. The number of CPU/DSP/VLIW processor cycles are reduced during the speech decoding in the speech codec decoder module to draw less power by mobile device.

Further, a speech receiver is configured to receive decoded speech from a DAC. The DAC transmits decoded speech received from the speech codec decoder.

Thus, the present invention also provides method to improve the power consumption in a voice call in mobile devices. The present method yields 33 percent savings in current consumption in a voice call.

The talk time is increased by less power consumption, thereby reduction of thermal aspect and extension of battery life.

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

In order to more clearly and concisely describe and point out the subject matter of the claimed invention, the following definitions are provided for specific terms, which are used in the following written description.

The term "talk time" refers to the time during which a mobile telephone/mobile device is in use to handle calls, especially as a measure of the duration of the telephone's/mobile's battery.

The present invention provides a system and method for optimizing power consumption in mobile devices. The system comprises a microphone, an anti-aliasing filter, a speech codec encoder, ADC, a speech codec decoder, a speech codec decoder and a speech receiver. The significant reduction of processor cycles in the speech codec (encoder and decoder) modules enables reduction of power consumption in the talk time. The system provides a simple method of optimizing power consumption by reducing number of processor cycles in mobile devices.

FIG. 1 illustrates a block diagram of a system for optimizing power consumption in mobile devices, according to one embodiment of the invention. In a preferred embodiment, the system comprises a microphone (101) which is coupled with a mobile device. The microphone (101) is configured to receive input speech and converts the speech into an electrical signal. An anti-aliasing filter (AAF) (102) is configured to filter components of the speech signal which are above the Nyquist frequency to prevent aliasing occurring at the sampling stage. The AAF (102) receives speech signals from the microphone (101) and transmits signal to an Analog to Digital Converter (ADC) (103).

ADC (103) receives the speech signal from AAF (102) and converts into digital signal for further processing. Generally, an ADC converts a continuous-time and continuous-amplitude analog signal to a discrete-time and discrete-amplitude digital signal. Furthermore, instead of continuously performing the conversion, an ADC does the conversion periodically, sampling the input, limiting the allowable bandwidth of the input signal.

A speech codec encoder module (104) is present at transmitting end. The speech codec encoder module is configured to compress/encode the speech signals running on CPU/DSP/VLIW processor for efficient transmission over wireless channels. The number of CPU/DSP/VLIW processor cycles are reduced significantly during encoding of speech signal in the speech codec encoder module (104).

The reduction of processor cycles results in drawing less power by the mobile device. The encoded signals are transmitted over transmission network (106) followed by a channel codec encoder (105). The encoded signals are then transmitted over a transmission network.

Further, a speech codec decoder module (108) is present at receiving end. The speech codec decoder module (108) is configured to decompress/decode the received compressed speech signals (running on a CPU/DSP/VLIW processor) from a channel codec decoder (107). The number of CPU/DSP/VLIW processor cycles taken to decode the compressed speech signals reduces significantly in the speech codec decoder module (108) which results in reduced power consumption by the mobile device.

In an embodiment of the invention, an encoder/decoder state variable is communicatively coupled with the signal processing chain of speech codec modules (104, 108). The signal processing functions involved in codec modules have encoder/decoder state variable parameters that are used across speech frame boundaries. The speech data is 13 bits left justified giving sufficient degrees of freedom to turn off saturation in many of the signal processing functions. The saturation is turned off if the state variable detects bit exactness. In other places saturation is retained. The above exercise is performed in loop code only. The loop code may include but not limited to for loop, while loop, do while loop etc.

The encoder/decoder state variable parameters are configured to check the status after every frame of speech signal is processed during power optimization. Further, the state variable prevents the failure of the software code. The encoder/decoder state variable checks correctness of the optimization at every stage of implementation. In a DSP ISA (Instruction Set Architecture) with saturation embedded in the instruction set, turning off saturation in loop code may not be necessary.

Further, a speech receiver (110) is configured to receive decoded speech from a Digital to Analog Converter (DAC) (109). Generally, a DAC converts an abstract finite-precision number (usually a fixed-point binary number) into a physical quantity (e.g., a voltage or a pressure). DACs are often used to convert finite-precision time series data to a continually varying physical signal. Here, the DAC (109) transmits decoded speech signals received from the speech codec decoder module (108).

Figure 2:
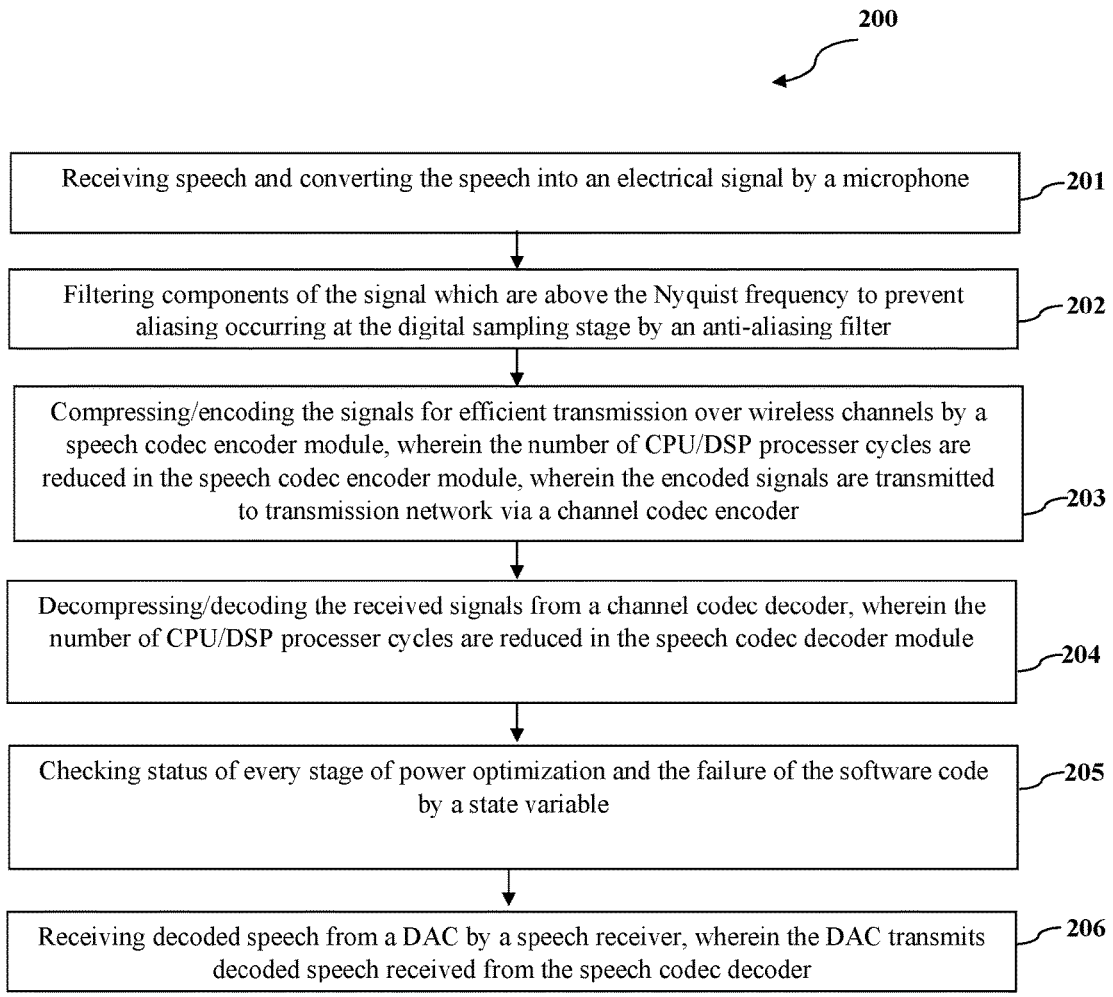
FIG. 2 illustrates method for optimizing power consumption in mobile devices.

FIG. 2 illustrates the method for optimizing power consumption in mobile devices, according to one embodiment of the invention. In a preferred embodiment, the method initiates with the step of receiving speech and converting the speech into an electrical signal by a microphone (101), at step 201.

At step 202, the components of the signal which are above the Nyquist frequency are filtered to prevent aliasing which is occurring at the sampling stage. At step 203, the speech signals are compressed/encoded for efficient transmission over a wireless channel by a speech codec encoder module. The number of CPU/DSP/VLIW processor cycles are reduced significantly during the speech encoding in the speech codec encoder module (104). Further, status of encoder state variable is checked after every frame of speech signal is processed during power optimization and this prevents failure of the software code at step 205. The encoded signals are transmitted to transmission network via a channel codec encoder (105).

At step 204, the compressed speech signal is received from the channel codec decoder. Wherein they are decompressed/decoded by the speech codec decoder (107). The number of CPU/DSP/VLIW processor cycles are reduced significantly during speech signal decoding in the speech codec decoder module (108). Further, status of decoder state variable is checked after every frame of speech signal is processed during power optimization and this prevents failure of the software code at step 205.

At step 206, decoded speech from the DAC (109) is received by a speech receiver (110). The DAC (109) transmits decoded speech signals received from the speech codec decoder module (108).

In an embodiment of the invention, the Arithmetic Logic Unit (ALU) of the DSP/VLIW architecture is designed without saturation in the critical instructions. The critical instruction includes but not limited to, Multiply and Accumulate (MAC) and shift instructions. Thus, low power speech codec implementation is achieved using the present invention.

Thus, the present invention provides a method to improve the power consumption in a voice call in mobile device. The talk time is increased by less power consumption, thereby reduction of thermal aspect and extension battery life.

The description of the present system has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As used in this application, the terms "software", may be a combination of hardware and software, software, or software in execution. For example, software can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, software include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A system for optimizing power consumption in mobile devices, the system comprising:
   a. a microphone configured to receive input speech and convert speech into an electrical signal, wherein the microphone is coupled with the mobile device;
   b. an anti-aliasing filter (AAF) configured to filter components of speech signal that are above the Nyquist frequency to prevent aliasing occurring at the sampling stage, wherein the AAF receives speech signals from the microphone and transmits the signal to an Analog to Digital Converter (ADC);
   c. a speech codec encoder module configured to compress/encode speech signals for efficient transmission over wireless channels, wherein the number of CPU/DSP/VLIW processor cycles taken to encode the speech signals are reduced significantly in the speech codec encoder module to draw less power by the mobile device, wherein the encoded signals are transmitted over transmission network via a channel codec encoder, wherein the speech codec encoder module is present at transmitting end;
   d. a speech codec decoder module configured to decompress/decode the received compressed speech signal from a channel codec decoder, wherein the number of CPU/DSP/VLIW processor cycles taken to decode the compressed speech signal are reduced significantly in the speech codec decoder module to draw less power by the mobile device, wherein the speech codec decoder module is present at receiving end;
   e. an encoder/decoder state variable communicatively coupled with the signal processing chain of the speech codec modules, wherein the state variable parameters are configured to check the status after every frame of speech signal and prevent the failure of software code during the power optimization; and
   f. a speech receiver configured to receive decoded speech from a Digital to Analog Converter (DAC), wherein the DAC transmits decoded speech signals received from the speech codec decoder module.

2. The system as claimed in claim 1, wherein the speech codec module includes Adaptive Multi-Rate Narrow band codec (AMR-NB), Enhanced full rate codec (EFR), Half Rate codec (HR), Adaptive Multi-Rate Wideband (AMR-WB) and Enhanced Voice Services (EVS) codecs.

3. The system as claimed in claim 1, wherein the mobile device includes portable cell phone, mobile handset, mobile phone, wireless phone, cellular phone, portable phone, a personal digital assistant (PDA), and smartphones.

4. The system as claimed in claim 1, wherein the CPU/DSP/VLIW processor cycles taken to encode and decode the speech signals are reduced significantly to draw lower current by the mobile device.

5. The system as claimed in claim 1, wherein the optimizing power consumption is applicable in voice playback and voice record with no transmission.

6. The system as claimed in claim 1, wherein the current consumption is reduced by 33 percent in a voice call over the prevailing implementation.

7. A method for optimizing power consumption in mobile devices, the method comprising the steps of:
   a. receiving speech signals and converting speech signals into an electrical signal by a microphone, wherein the microphone is coupled with the mobile device;
   b. filtering components of speech signal that are above the Nyquist frequency to prevent aliasing occurring at the sampling stage, wherein the AAF receives speech signals from the microphone and transmits signal to the ADC;
   c. compressing/encoding the speech signals for efficient transmission over wireless channels by a speech codec encoder module, wherein the number of CPU/DSP/VLIW processor cycles taken to compress/encode speech signals are reduced significantly in the speech codec encoder module, wherein the encoded signals are transmitted over a transmission network via a channel codec encoder;

d. decompressing/decoding the received compressed speech signals from a channel codec decoder, wherein the number of CPU/DSP/VLIW processor cycles taken to decompress/decode the compressed speech signals are reduced significantly in the speech codec decoder module;

e. checking status of encoder/decoder state variable after every frame of processed speech signal and prevent the failure of software code during power optimization; and f. receiving decoded speech signals from a DAC by a speech receiver, wherein the DAC transmits decoded speech signals received from the speech codec decoder module.

8. The method as claimed in claim 7, wherein the speech codec modules includes Adaptive Multi-Rate Narrow band audio codec (AMR-NB), Enhanced full rate codec (EFR), Half Rate codec (HR), Adaptive Multi-Rate Wideband (AMR-WB) and Enhanced Voice Services (EVS) codecs.

9. The method as claimed in claim 7, wherein the mobile device includes portable cell phone, mobile handset, mobile phone, wireless phone, cellular phone, portable phone, a personal digital assistant (PDA) and smartphones.

10. The method as claimed in claim 7, wherein the Arithmetic Logic Unit (ALU) of a DSP/VLIW architecture is designed without saturation in the critical instructions, wherein the critical instruction include Multiply and Accumulate (MAC) and shift instructions.

* * * * *